Jan. 6, 1948.   J. H. MILLHOLLAND   2,433,957
HANDLING HOLDER FOR OPENING EGGS
Filed Feb. 7, 1945
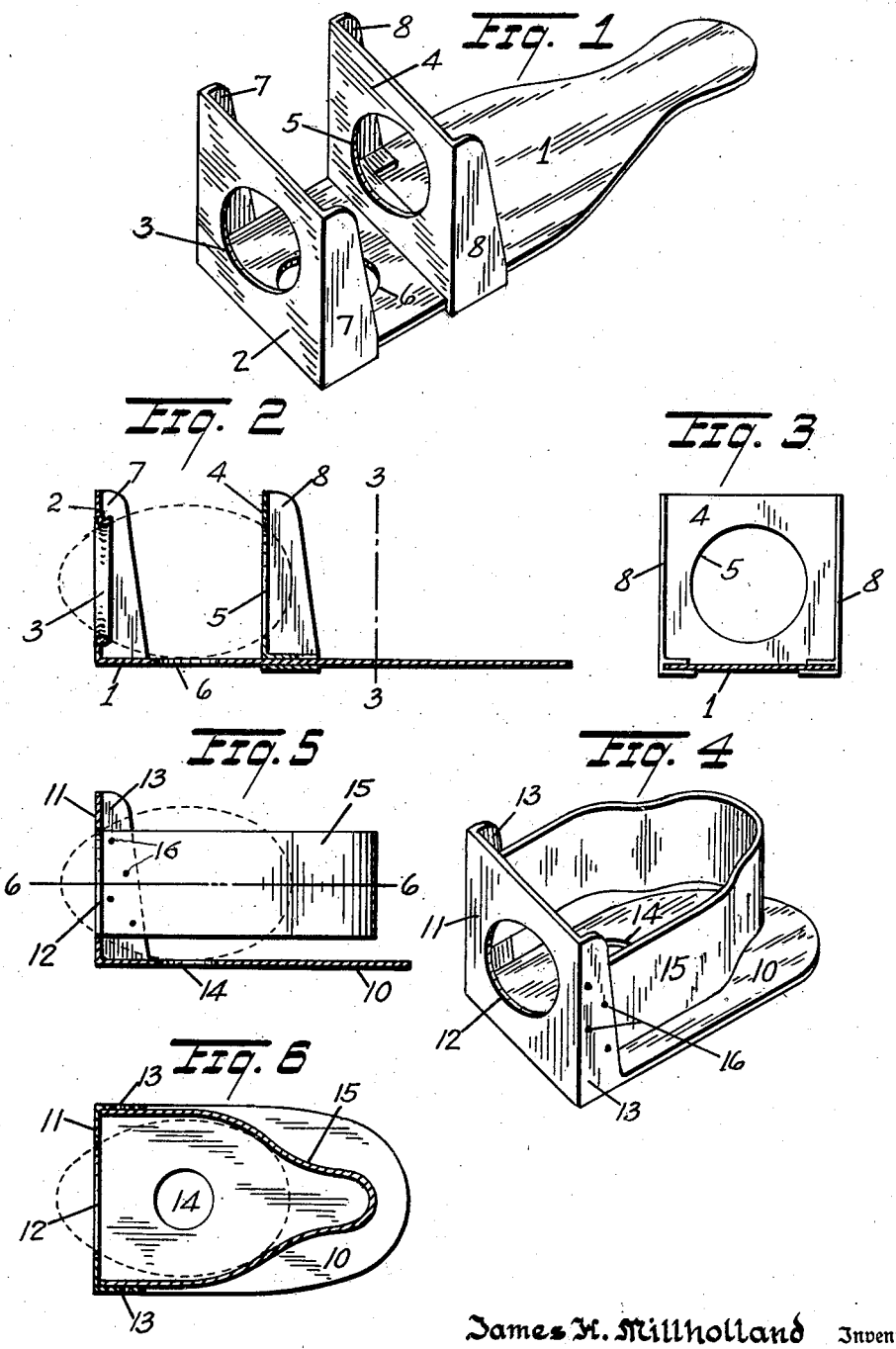
James H. Millholland  Inventor
By W. G. & D. M. Stewart
Attorneys Patented Jan. 6, 1948

2,433,957

UNITED STATES PATENT OFFICE 2,433,957

HANDLING HOLDER FOR OPENING EGGS

James H. Millholland, Philadelphia, Pa.

Application February 7, 1945, Serial No. 576,611

2 Claims. (Cl. 65—22)

My invention relates to a handling holder for eggs intended to grip and position a hot boiled egg for convenient and comfortable manipulation in breaking open its shell and removing its contents, my object being to provide a simple and effective carrier for holding an egg without hand contact with its hot surface, and for maintaining its grip on the broken-open shell for neat removal of its contents in an improved and sanitary manner.

My improved device comprises a holder readily grasped by hand and having pressure means for engaging and forcing an end of an egg to be opened into protruding position through an apertured wall, and to retain its hold on the shell when the protruding end is struck off by a knife or the like, all as will be more fully described hereinafter in connection with the accompanying drawings, and the novel features thereof defined in the appended claims.

In the drawings:

Fig. 1 is a perspective elevation of a handling holder for eggs showing one embodiment of my invention.

Fig. 2 is a longitudinal sectional elevation of the same.

Fig. 3 is a rear end sectional elevation, taken on the line 3—3 of Fig. 2.

Fig. 4 is a perspective elevation showing a varied embodiment of my invention.

Fig. 5 is a longitudinal sectional elevation of the embodiment shown in Fig. 4.

Fig. 6 is a sectional plan view of the same, taken on the line 6—6 of Fig. 5.

The opening of boiled eggs and removal of their contents to a service dish, is commonly performed by distressful hand grip of the hot surface and likelihood of unsanitary finger contact in removing its contents. My improved handling holder avoids any finger contact with the hot egg or its contents, and, as shown in Fig. 1, 2 and 3, may consist of an egg supporting plate 1, having an angular end extension 2, provided with an aperture 3 adapted to receive the protruding end of an egg. A presser or follower 4, is shown as similar to extension 2, preferably apertured at 5 to engage an egg end, and mounted to slide on plate 1, as shown, from and toward extension 2.

In use, presser 4 is moved away from extension 2 and an egg, shown in dotted outline in Fig. 2, may be placed between them on plate 1, as by a spoon or other utensil, avoiding direct hand contact with the hot surface. When thus placed, presser 4 is moved toward extension 2, engaging the rear end of the egg in its aperture 5, and forcing the front end of the egg into protruding engagement in the aperture 3 of extension 2. When the egg is thus positioned, my holder may be freely handled without contact with the egg, and the end of the egg protruding through end aperture 3 may be neatly severed or broken away, as by a knife or other suitable utensil, and the remainder of the egg will continue to be held, and its contents may then be removed neatly and in a sanitary manner to a serving dish, as by means of a spoon or other scoop, without danger of contamination. A finger aperture 6 may be provided in plate 1, rearward of extension 2, if desired, to facilitate removal of the empty shell; and aperture 3 may be inwardly flared, as shown, to insure an unobstructed flat outer face on extension 2, surrounding its aperture 3, to facilitate severing action of knife on the protruding end of an egg. End plate 2 may be braced by partial side walls 7, 7, and pressure 4, likewise braced by partial side walls 8, 8, as shown.

My invention may be variously embodied, and in Figs. 4, 5 and 6, I have indicated an egg-supporting plate 10 having an angular end extension 11, apertured at 12, with partial side bracing walls 13, 13, and a finger aperture 14 in plate 10, all similar to the showing in Figs. 1, 2 and 3. Instead of the presser or follower 4 however, in this embodiment, I employ a flexible strap 15, of rubber, leather, or other suitable material, substantially U-shape, as shown, and its ends secured to bracing walls 13, 13, as by rivets or their equivalent, indicated at 16. The closed loop of this flexible strap 15, extends rearward in suspended relation over plate 10 a sufficient distance to receive an egg, placed therein on plate 10, as by a spoon in the manner set forth in the first described embodiment. The egg thus enclosed within strap 15, rearward of extension 11, may have its end pressed into protruding position in extension aperture 12 by finger grip of the outer surface of strap 15, providing a convenient handle for the device, and the finger pressure flexing said strap and pinching its loop end together into following contact with the egg. As thus held, the breaking or severing of the protruding egg end, and removal of its contents, may be performed in the manner above described for the first embodiment. If the strap 15 is made of elastic or other resilient material, it may act, without finger pinching, to press the egg into end protruding position in aperture 12.

As thus described, it will be apparent that I accomplish my described purpose in each embodiment—the egg is securely held for convenient and comfortable manipulation and its contents may be removed in a neat and sanitary manner. And it is obvious that other embodiments may be developed within the spirit of my invention as defined in the following claims.

What I claim is:

1. A handling holder for opening eggs comprising an egg-supporting plate having an angular apertured extension adapted to receive the protruding end of an egg, and a flexible U-shaped presser strap extending rearwardly from said angular extension yieldable to hand-pinching pressure, adapted to press an egg enclosed by said strap into end-protruding position in said angular extension aperture; said egg-supporting plate having an egg-dislodging finger-aperture rearward of said angular extension.

2. A handling holder for opening eggs, comprising an apertured egg-supporting plate for receiving a projecting end of an egg, and a handling holder extending at right angles from said plate comprising a flexible U-shaped egg-encircling strap yieldable to hand-gripping pressure for projecting an egg end into said plate aperture.

JAMES H. MILLHOLLAND.

REFERENCES CITED

The following references are of record in the file of this patent:

UNITED STATES PATENTS

| Number | Name | Date |
|---|---|---|
| 499,081 | Anderson | June 6, 1893 |
| 1,941,088 | Heller | Dec. 26, 1933 |
| 567,622 | Spurr | Apr. 7, 1896 |
| 53,712 | Wegrather | Apr. 3, 1866 |
| 70,350 | Nathan | Oct. 29, 1867 |
| 1,037,882 | Erickson | Sept. 10, 1912 |
| 221,389 | Birch | Nov. 11, 1879 |
| 227,633 | Koska | May 18, 1880 |
| 1,464,967 | Beauregard | Aug. 14, 1923 |
| 898,007 | Howe | Sept. 8, 1908 |
| 205,048 | Bunker | June 18, 1878 |